United States Patent [19]

Freeman et al.

[11] 4,249,820
[45] Feb. 10, 1981

[54] REGISTRATION CONTROL SYSTEM FOR COPY MACHINE

[76] Inventors: Lawrence M. Freeman, 3160 Buford Hwy., Apt. A-18, Atlanta, Ga. 30329; Francis T. Arnold, 2379 Tristan Cir., NE., Atlanta, Ga. 30345

[21] Appl. No.: 24,017

[22] Filed: Mar. 26, 1979

[51] Int. Cl.³ .............................................. G03B 27/52
[52] U.S. Cl. ......................................... 355/29; 355/45; 355/18
[58] Field of Search ..................... 355/5, 13, 28, 29, 7, 355/14, 45, 44, 18

[56] References Cited

U.S. PATENT DOCUMENTS

| | | | |
|---|---|---|---|
| 3,418,047 | 12/1968 | Lee et al. | 355/13 X |
| 3,656,851 | 4/1972 | Kakii et al. | 355/28 X |
| 3,806,241 | 4/1974 | Gregg et al. | 355/13 |
| 3,992,089 | 11/1976 | Hirose et al. | 355/13 X |

*Primary Examiner*—Michael L. Gellner
*Assistant Examiner*—W. J. Brady
*Attorney, Agent, or Firm*—B. J. Powell

[57] ABSTRACT

A registration control system for a copying machine adapted to copy images from an original document medium onto selected different length sheets of copy paper with the copying machine having cutter means for selectively cutting the sheets of copy paper to length, conveying means for transporting the cut sheets of copy paper along a conveying path through an exposure station with the image projected onto the sheet of copy paper in the exposure station where the registration control system includes a cutter actuator for causing the cutter means to cut the sheets of copy paper to length; a conveyor actuator for causing the conveying means to move the cut sheets of copy paper through the exposure station; and manually adjustable control means interconnecting the cutter actuator and the conveyor actuator to cause cutter actuator to operate the cutter means to cut the sheets of copy paper to manually selected lengths while causing the conveyor actuator to operate the conveying means so that each cut sheet of copy paper is moved through the exposure station with its transverse central axis normal to the conveying path in registration with the transverse image central axis of the projected image during exposure of the cut sheet of copy paper.

10 Claims, 10 Drawing Figures

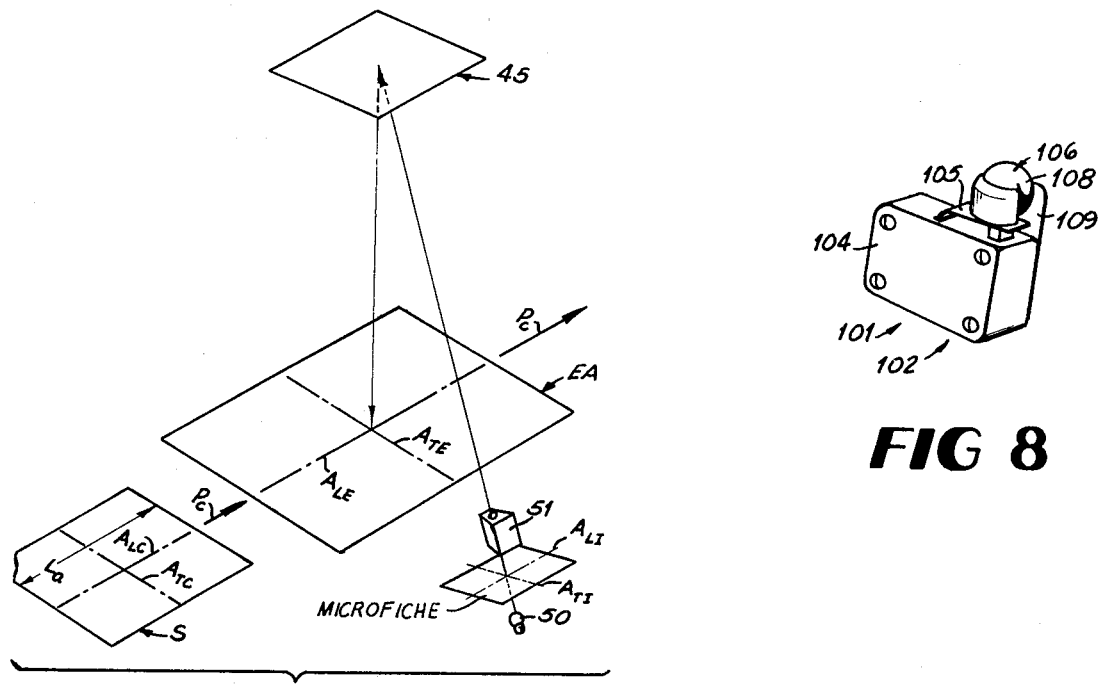
FIG 5
FIG 8
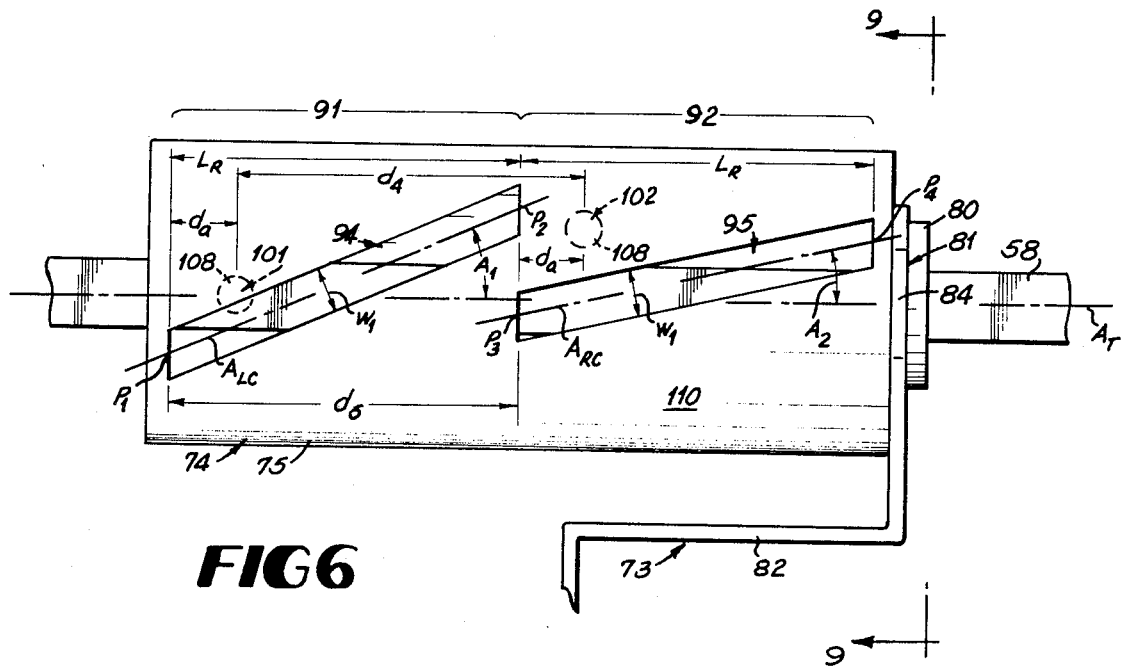
FIG 6

REGISTRATION CONTROL SYSTEM FOR COPY MACHINE

BACKGROUND OF THE INVENTION

A desirable feature of copying machines is the capability of allowing the machine operator to select the size copy paper on which the projected image in the machine will be copied. Such copying machines may be used to reproduce the visual image on the original document at its actual size as with the case of the typical office copier, at an enlarged size as with the case of micrographic reader-printers for microfilm and/or microfiche, or at a reduced size as with the case of reducing copying machines. Some copying machines have attempted to solve this problem by allowing the operator to insert different size sheets of copy paper into the machine. Still other machines have conveniently fed the copy paper through the machine from a continuous supply roll with the copy paper being cut by a paper cutter in the machine to a length selected by the machine operator.

These machines usually located the copy paper in exposure position using the leading edge of the cut sheet of copy paper by always stopping the leading edge of the copy paper at the same position, that position being one edge and corner of the largest possible exposure area in the machine. This usually requires that the original document medium being reproduced be placed along one edge or one corner of the document carrying area of the machine if the document carrying area is fixed in the machine or, if the document carrying area can be shifted in the machine, usually requires that the original document medium be positioned so that the projected image from the original document medium be aligned with one edge or one corner of the projected image area in the machine. This is because the edge or corner of the projected image in the machine must always lie in registration with the leading edge of the copy paper stopped at the edge or corner of the largest exposure area in the machine. This has not been particularly successful in micrographic reader-printers inasmuch as it is relatively difficult to locate the micrographic film in the proper position on the image projection area to always assure that the film image is located properly for copying on the copy paper. Another problem in using this registration technique with micrographic reader-printers is that the resolution of the optical system which projects the film image onto the copy paper is usually best along the center of the image projection area of the reader-printer and, having to locate the film image away from this central position, many times results in a significant loss of resolution in the copied document. Thus, it will be seen that the prior art has been relatively unsuccessful, especially with micrographic reader-printers in solving the problem of cutting the copy paper to any desired length while still allowing the film image to be conveniently located centrally in the image projection area for best resolution.

Yet another problem associated with these prior art copying machines is that no visual correlation between the size of the copy paper selected for copying and that portion of the image to be copied is usually provided. Even if some visual correlation is provided, it is relatively difficult to use and generally requires guesswork on the part of the operator to properly locate the original document. This is especially true where an infinite number of copy paper lengths can be selected over the range of the machine.

SUMMARY OF THE INVENTION

These and other problems and disadvantages associated with the prior art are overcome by the invention disclosed herein by providing a copy paper length and registration control mechanism for a copying machine which permits the image to be copied to be centrally located in the image projection area on the copying machine while still allowing the length of the copy paper to be adjusted. The copy paper is always properly positioned so that the centrally located image to be copied is properly in registration with the copy paper during the copying process. The invention provides means for visually correlating the image being copied with the selected length of copy paper used to facilitate the location of the original document by the operator.

The apparatus of the invention is a registration control system for a copy machine which centers the different lengths of copy paper in the exposure area of the copy machine by automatically locating the transverse central axis of each sheet of copy paper in registration with the transverse central axis of the exposure area. The registration control system may also control the cutter mechanism in the copy machine to cut the copy paper into sheets of selected length. The selected length of the cut sheets of copy paper may be manually selected.

The apparatus of the invention is designed for use with a copy machine with a copy paper cutter mechanism for selectively cutting the desired length of copy paper from a supply roll of the copy paper and includes a control mechanism that selectively adjusts the length at which a sheet of copy paper is cut from the supply roll and that automatically locates the copy paper so that its center is in registration with the center of the exposure area at which the projected image being copied is located during exposure of the copy paper. The control mechanism of the invention includes a control cam member which is synchronously driven with the mechanism feeding the sheet of copy paper to the cutter mechanism and to the exposure station in the copy machine, a cutter actuator member operatively associated with the control cam to be activated thereby and a registration actuator member which is also operatively associated with the control cam so that the control cam controls the registration of the copy paper in the copy machine. A cam control mechanism is provided which allows the machine operator to selectively change the relative orientation of the cam simultaneously with respect to both the cutter actuator mechanism and the registration actuator mechanism so that different length sheets of copy paper can be cut from the supply roll and registration of the thusly cut sheets still be maintained with respect to the desired area of the projected image to be copied which is centrally located in the exposure area of the copy machine. An indicator mechanism is provided at the viewing area when the invention is incorporated in a reader-printer to correlate the projected viewed image with the copy paper registration in the exposure station for printing the viewed image.

The invention is described as applied to micrographic reader-printers for microfilm and/or microfiche, but can be readily applied to other types of copying machines.

These and other features and advantages of the invention disclosed herein will become more apparent upon consideration of the following description and accompanying drawings wherein like characters of reference designate corresponding parts throughout the several views and in which:

BRIEF DESCRIPTION OF THE DRAWINGS

FIG. 5 is a perspective schematic diagram interrelating the paper flow path and the projected optical image paths of the reader-printer of FIG. 1;

FIG. 6 is an enlarged view taken along line 6—6 in FIG. 2 illustrating part of the registration control mechanism;

FIG. 8 is an enlarged perspective view illustrating the actuator switch assemblies;

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

The invention is illustrated in the figures as being incorporated in a micrographic reader-printer which has the capability of copying images from microfiche onto copy paper or selectively projecting the image onto a viewing screen. It is to be understood, however, that the invention is shown embodied in a reader-printer simply for purposes of illustration. Thus, this embodiment is not intended to be limiting since the invention may be incorporated in any copying machine. While only a microfiche type reader-printer is illustrated, it is also to be understood that the invention could likewise be incorporated in a reader-printer for use with roll microfilm rather than microfiche. As a matter of fact, most microfiche type reader-printers can be easily converted to a microfilm type reader-printer through an interchangeable adapter.

Figure 1:
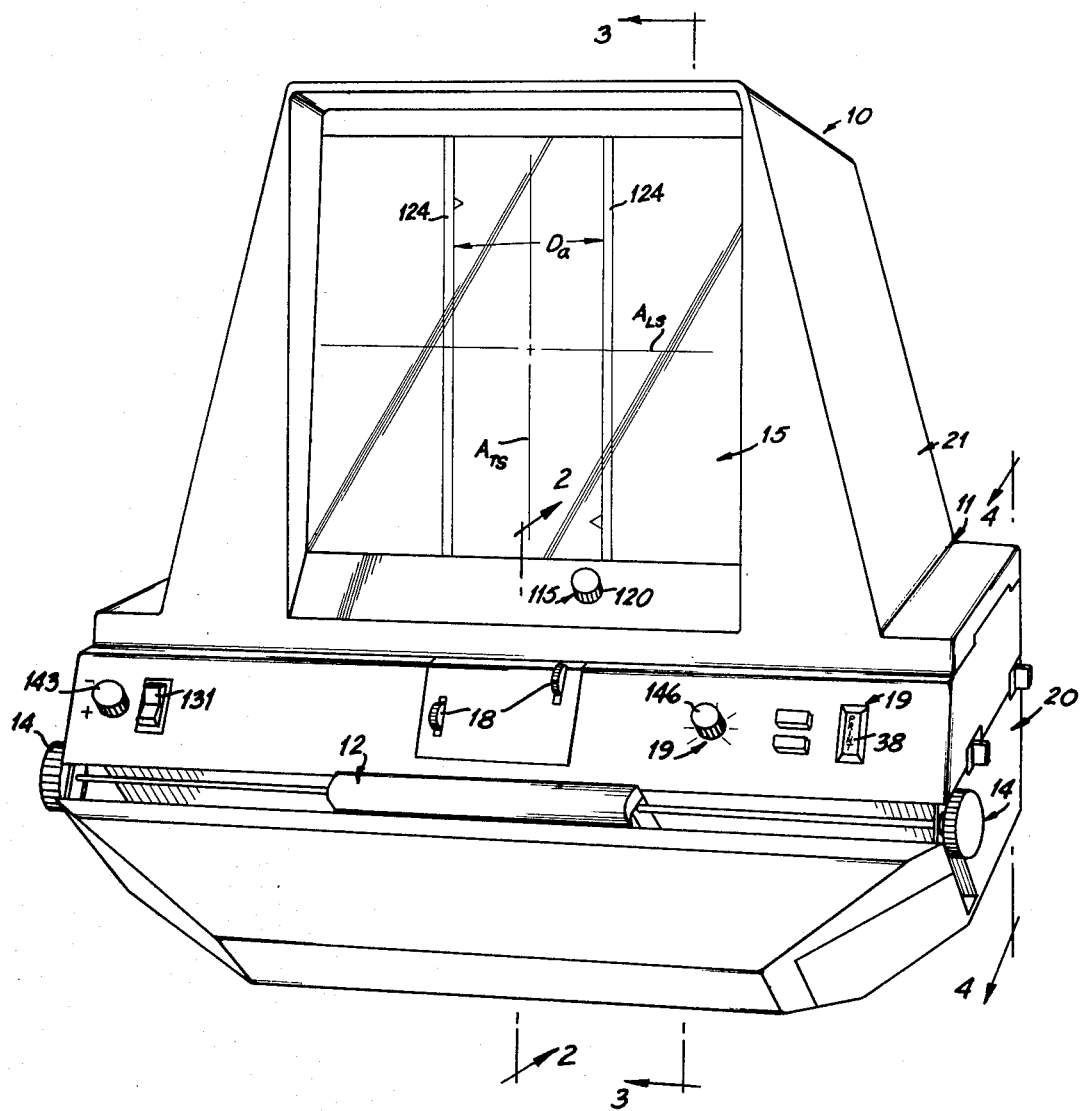
FIG. 1 is a perspective view of a reader-printer incorporating the invention.

As seen in FIG. 1, the reader-printer 10 includes a housing 11 which mounts the components therein. The microfiche is mounted in the microfiche carrier 12 equipped with appropriate fiche orientation controls 14 to properly orient the microfiche with respect to the lens assembly in the machine so that the image on the microfiche can be projected in the machine. As is conventional, the visual image on the microfiche can be projected onto the viewing screen 15 or alternately onto the copy paper carried in an exposure station as will become more apparent. Appropriate optics controls 18 are provided to control the focus and the image rotation in the reader-printer 10. Appropriate printing controls 19 are provided to control the printing cycle of the reader-printer 10.

Basically, the reader-printer 10 can be divided into a printing section 20 and an optics section 21. The printing section 20 is seen in FIGS. 2 and 4 with a base frame 22 which mounts the various components thereon while the optics section 21 is illustrated in FIG. 3.

Figure 2:
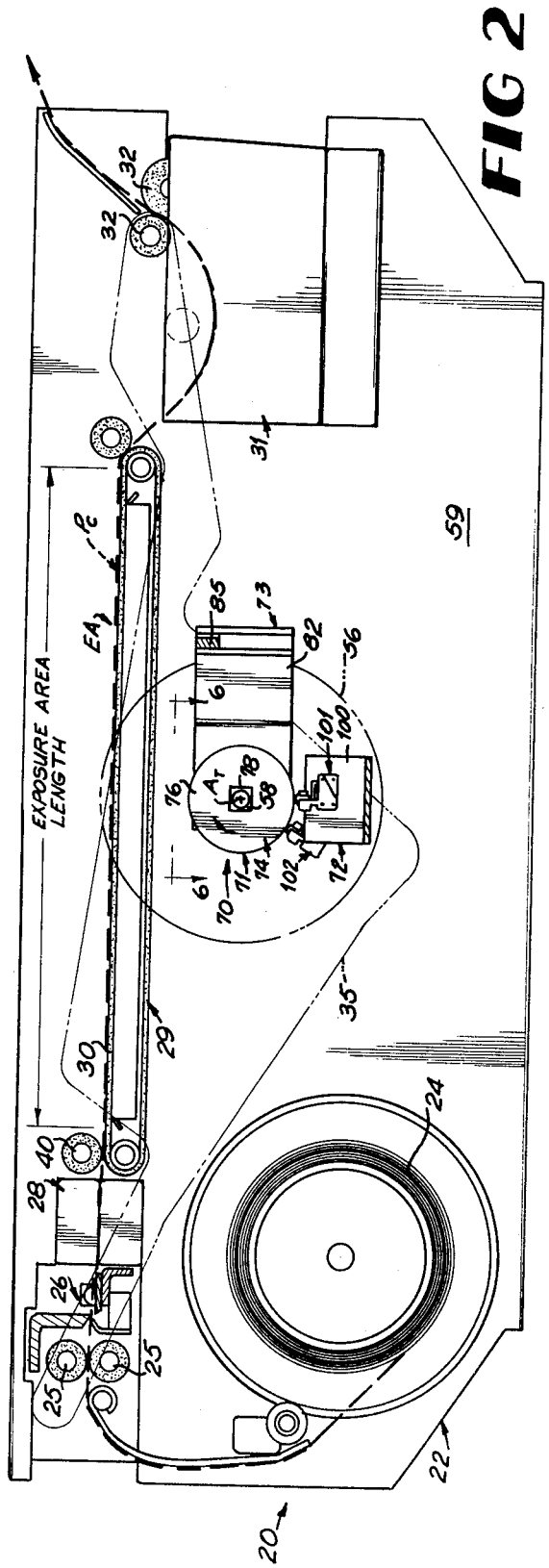
FIG. 2 is an enlarged partial front view with the cover removed taken along line 2—2 in FIG. 1 showing the printing section of the reader-printer with the front frame member omitted for clarity.

FIG. 2 is a front view of the printing section taken generally along line 2—2 in FIG. 1 with the front main panel of the frame 22 omitted for clarity. The copy paper is carried in a continuous supply roll 24 from which it is moved by a pair of feed rolls 25 through paper cutter 26 and corona units 28 to an exposure station 29. The exposure station 29 has a vacuum belt conveyor 30 which transfers each sheet of copy paper cut from the supply roll 24 by the cutter 26 into the exposure station until the sheet of copy paper is centered along the length of the exposure area EA of the exposure station so that the copy paper can have the projected optical image impressed thereon to expose the copy paper and form an electrostatic latent image on the copy paper. The belt conveyor 30 then transfers the exposed copy paper out of the exposure station 29 into the developing section 31 which applies a toner to develop the electrostatic latent image on the sheet of copy paper into a permanent visual image on the finished copy and a pair of exit squeegee rolls 32 transport the finished copy out of the machine. The copy paper path $P_c$ is seen in FIG. 2 as a dashed line.

Figure 4:
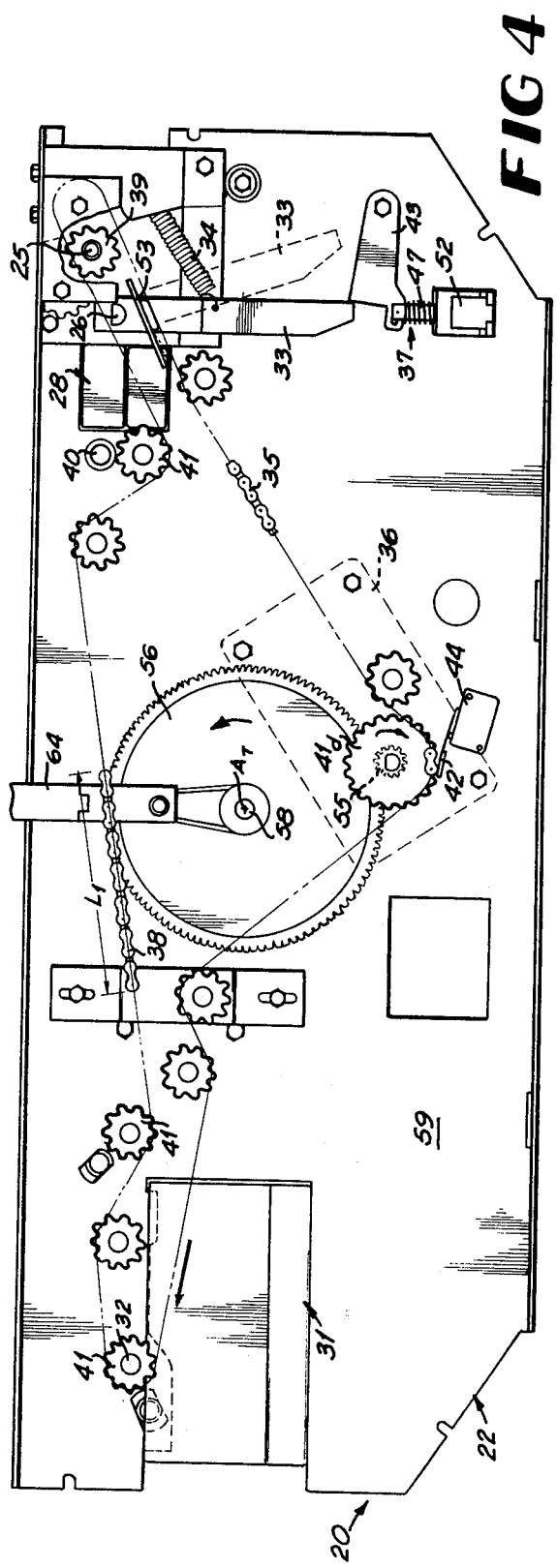
FIG. 4 is a partial rear view with the covers removed taken along line 4—4 in FIG. 1 showing the printing section drive system.

The various components in the printing section 20 as seen in FIGS. 2 and 4 are driven by an endless drive chain 35 from motor 36. The drive chain 35 is shown by a phantom line in FIG. 2 and fragmentally shown by solid lines in FIG. 4 with the remainder shown by a ditto line since FIG. 4 is a rear view of the printing section 20. Conceptually, the chain drive system in the printing section 20 corresponds to that described in detail in U.S. Pat. Nos. 3,730,622 and 3,922,083. Thus, the single drive motor 36 drives the chain 35 one complete revolution along the chain path during each print cycle of the reader-printer 10 thereby synchronizing the movement of the copy paper with the movement of chain 35. The printing cycle is stopped by a cycle stop lug 42 on the forwardly facing side (offside in FIG. 4) of chain 35 engaging a cycle stop switch assembly 44 as seen in FIGS. 3 and 4.

Figure 3:
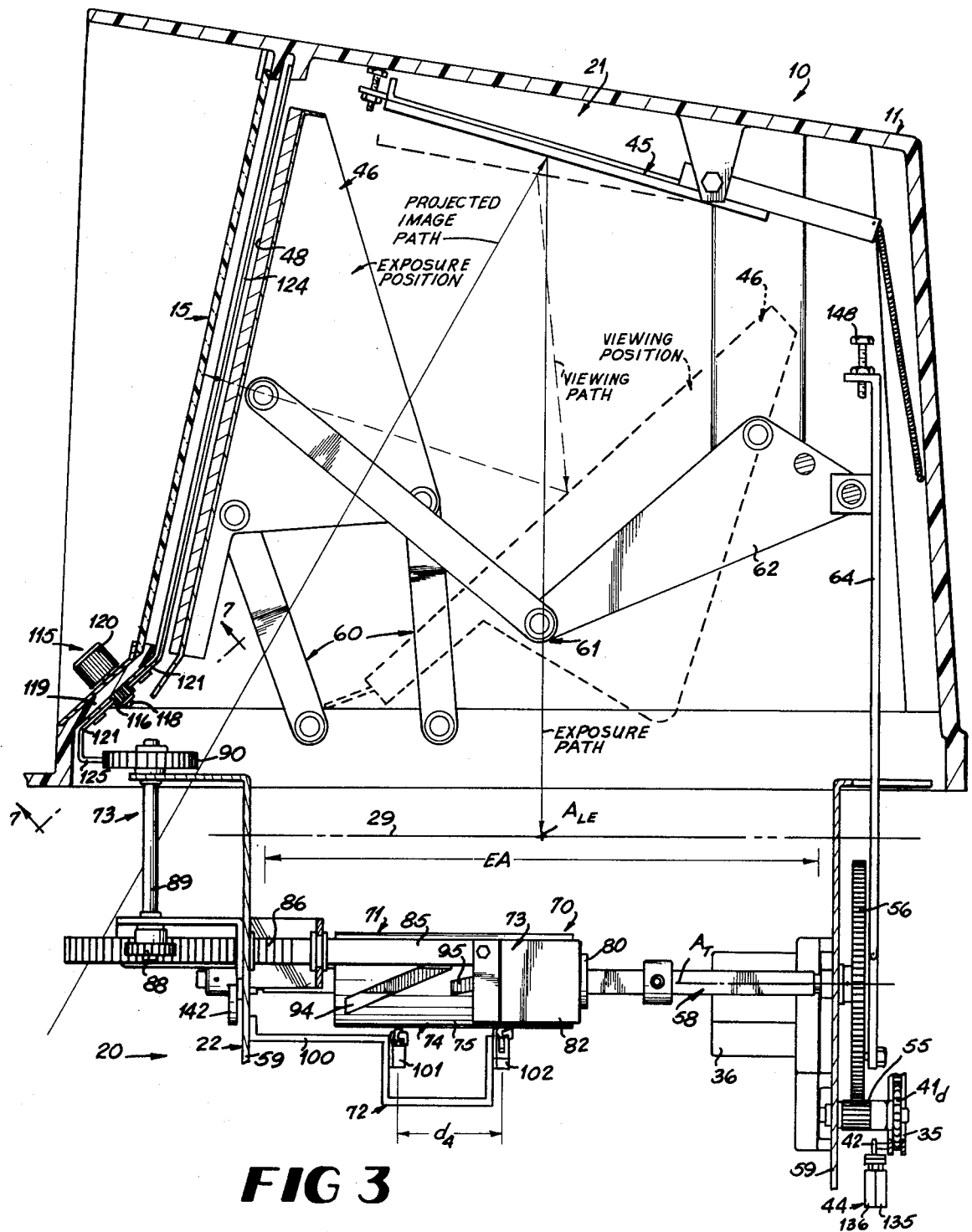
FIG. 3 is an enlarged partial vertical cross-sectional view with the covers removed taken along line 3—3 in FIG. 1 showing the optics section of the reader-printer and the registration control mechanism.

The drive chain 35 is also equipped with a short feed chain section 38 on the rearwardly facing side of chain 35 (the near side in FIG. 4) which engages a feed drive sprocket 39 on one of the paper feed rolls 25 to feed the copy paper from the supply roll 24 through the cutter 26 and the corona units 28 until the leading end of the copy paper is engaged by the belt conveyor 30 and the leading hold-down roll 40 at the inlet end of conveyor 30 as seen in FIG. 3. It will be appreciated that the feed drive sprocket 39 will only be engaged by the feed chain section 38 and not the endless chain 35 while the rest of the driven sprockets 41 to the conveyor 30 and exit rolls 32 are engaged by the endless chain 35 and not the feed chain section 38. The length $L_1$ of the feed chain section 38 is selected so that the sprocket 39 is driven only long enough for the leading end of the copy paper to be engaged and driven by the belt conveyor 30 and the leading hold-down roll 40. The sprocket 39 is then released so that the copy paper continues to be withdrawn from the supply roll 24 since conveyor 30, driven by chain 35, is continuously driven as long as the chain 35 is driven by motor 36.

The paper cutter 26 is operated by a drive arm 33 connected thereto as seen in FIG. 4. When the drive arm 33 pivots counterclockwise as seen in FIG. 4 from the position seen in solid lines toward the position seen in dashed lines under the influence of spring 34, the paper cutter 26 (best seen in FIG. 2) cuts a sheet S of copy paper. The drive arm 33 is held in its cocked position shown in FIG. 4 by the solid lines by a solenoid activated trigger mechanism 37 also seen in FIG. 4. The trigger mechanism 37 has a pivoted trigger 43 urged toward its arresting position seen in FIG. 4 by spring 47 on solenoid 52. When the solenoid 52 is energized as will become more apparent, the trigger 43 is pivoted counterclockwise as seen in FIG. 4 against the force of spring 47 to cause the trigger 37 to release the drive arm 33. This allows the drive spring 34 to pivot the arm 33 counterclockwise and cut the sheet S of copy paper. When solenoid 52 is de-energized, the spring 47 returns the trigger 43 to the position seen in FIG. 4 while the arm 33 is left in its tripped position shown by dashed lines in FIG. 4. The drive arm 33 is provided with a cocking cam 53 also seen in FIG. 4 which is engaged only by the cycle stop lug 42 on drive chain 35 as it passes by the arm 33 during the latter part of the printing cycle. The lug 42 drives arm 33 clockwise to push it over trigger 43 until the trigger arrests the arm 33 in its cocked position.

When the belt conveyor 30 has driven the appropriate length of copy paper past the paper cutter 26, the paper cutter 26 is activated to cut the copy paper into a sheet as will become more apparent. The belt conveyor 30 continues to move the cut sheet of copy paper into the exposure station until the cut sheet of copy paper is in registration on the exposure station with the copy paper centered along its length and width with the length and width of the exposure station. The main drive motor 36 is then stopped as will become more apparent and the sheet of copy paper exposed to form the electrostatic latent image thereon. After the sheet of copy paper is exposed, the drive motor 36 is restarted so that the belt conveyor 30 moves the exposed sheet of copy paper out of the exposure station through the developing section 31 and then the exit squeegee rolls 32 move the finished copy out of the machine.

As seen in FIG. 5, which schematically shows the paper flow path and image optical path in the machine, it will be seen that the cut sheet S of copy paper is fed through the exposure station EA so that the longitudinal axis $A_{LC}$ of the copy paper is aligned with the longitudinal axis $A_{LE}$ of the exposure area EA in the exposure station 29. It will also be noted that the motor 36 is stopped when the cut sheet S of copy paper has its transverse central axis $A_{TC}$ in registration with the transverse central axis $A_{TE}$ of the exposure area EA in the exposure station 29. It will be appreciated that, as different length cut sheets S of copy paper are cut by the paper cutter 26, the longitudinal central axis $A_{LC}$ of the copy paper does not shift but the transverse central axis $A_{TC}$ does shift along the length of the cut sheet S of copy paper. The invention of this application is directed to a mechanism which insures that the transverse central axis $A_{TC}$ of the cut sheets S copy paper are in registration with the transverse central axis $A_{TE}$ of the exposure area EA in the exposure station 29. The transverse central axis $A_{TE}$ in the exposure station 29 does not, of course, longitudinally shift along the length of the exposure area as the length of the cut sheets S of copy paper is varied. Since the position of the transverse central axis $A_{TC}$ shifts along the length of the cut sheet S of copy paper as the length of the cut sheet S is varied, it will be seen that the drive motor 36 must be disabled at a different point in the printing cycle so as to stop the cut sheet S of copy paper with its transverse central axis $A_{TC}$ in registration with the nonmoving transverse central axis $A_{TE}$ of the exposure area EA in exposure station 29 as will become more apparent.

Referring to FIGS. 3 and 5, it will be seen that the optics section 21 includes a fixed mirror assembly 45 which is mounted in the upper section of the housing 11 so that, when the optical image is projected from the original document, the fixed mirror assembly 45 will project the optical image onto the exposure area EA with the projected optical image centered longitudinally along the exposure area EA on its longitudinal central axis $A_{TE}$ and also transversely centered in the exposure area EA along its longitudinal axis $A_{LE}$. Thus, it will be seen that, if the cut sheet S of copy paper is centered both on the longitudinal and transverse central axes $A_{LE}$ and $A_{TE}$, the optical image projected will be centered on the cut sheet S of copy paper as will become more apparent.

Because the reader-printer 10 has the capability of projecting the image from the original document medium onto the viewing screen 15 for viewing, the optics section 21 also includes a movable mirror assembly 46 seen in FIG. 3. The movable mirror assembly 46 is pivotally mounted in the upper section of the housing 11 so that, when the mirror assembly 46 is in its rearmost position shown in dashed lines in FIG. 3 for viewing the projected image, the reflective surface 48 intercepts the projected optical image from the fixed mirror assembly 49 and reflects this optical image onto the viewing screen 15. The viewing screen 15 also has a pair of central axes $A_{LS}$ and $A_{TS}$ (seen in FIG. 1) with the axis $A_{LS}$ corresponding to the axis $A_{LE}$ on the exposure area EA and the axis $A_{TS}$ corresponding to the axis $A_{TE}$ on the exposure area EA so that the reflective surface 48 on the movable mirror assembly 46 reflects the projected optical image from the fixed mirror assembly 45 with the projected image longitudinal axis $A_{LT}$ (FIG. 5) on the original document located along the longitudinal screen axis $A_{LS}$ on the screen 15 and the transverse image axis $A_{TI}$ (FIG. 5) on the original document located along the transverse screen axis $A_{TS}$. Thus, one is able to determine from the projected image on the viewing screen 15 where the projected image will be located relative to the exposure area EA in the exposure station 29 when the movable mirror assembly 46 is shifted forwardly to its printing position seen in solid lines in FIG. 3.

When the movable mirror assembly 46 is moved forwardly to its forwardmost printing position as shown by solid lines in FIG. 3, it will be seen that the movable mirror assembly 46 is moved out of the optical path between the fixed mirror assembly 45 and the exposure area EA in exposure station 29 so that the projected optical image will be impressed on the exposure area EA in the exposure station 29. The movable mirror assembly 46, when located in its forwardmost printing position, also serves to block the light that can enter the housing 11 through the viewing screen 15 so that inadvertent exposure of the cut sheet S of copy paper in the exposure station 29 is prevented. The projected optical image from the original document to the fixed mirror assembly 45 also passes behind the movable mirror assembly 46 without the movable mirror assembly 46 interfering with this optical image path.

Since the original document medium of the reader-printer 10 is microfiche, the optical image from the original document medium is projected from a light source 50 shown schematically in FIG. 5 and is focused by a lens assembly 51 also schematically shown in FIG. 5. The light source 50 and lens assembly 51 are actually mounted on the printing section 20 but are more closely associated with the optics section 21 and thus are shown in FIG. 5.

The movable mirror assembly 46 is driven by the drive system in the printing section 20. The output drive sprocket $41_d$ on drive motor 36 also has a spur gear section 55 thereon as seen in FIG. 3. The spur gear section 55 drives a large diameter timing spur gear 56 which is mounted on a timing shaft 58 rotatably journalled between the front and rear main panels 59 on the printing section base frame 22. The timing spur gear 56 and the spur gear section 55 on the drive sprocket $41_d$ are sized so that the gear 56 makes one revolution each time the drive chain 35 makes one complete traverse along the chain path. The movable mirror assembly 46 is movably mounted in the upper section of housing 11 on a modified parallelogram linkage 60 seen in FIG. 3. The mirror assembly 46 is movably driven by a drive transfer linkage 61 pivoted in the upper section of housing 11. The main link 62 in transfer linkage 61 is pivoted by a drive arm 64 pinned to the link 62 and eccentrically pinned to the timing spur gear 56. The drive arm 64 is connected to the gear 56 and linkage 61 so that when the spur gear 56 is stopped in the viewing position as seen in FIG. 4, the movable mirror assembly 46 is in the position shown by dashed lines in FIG. 3. Because the motor 36 is stopped in the same position at the end of a printing cycle, the mirror assembly 46 will always be positively located when it is being used during viewing. In this position, it will be seen that the pinned connection between drive arm 64 and the gear 56 is at about top dead center as seen in FIG. 4. The drive system, on the other hand, is stopped for exposure when the cut sheet S of copy paper is centered in the exposure area EA. Because the length of the cut sheet S varies, the relative positions of the drive chain 35 and timing gear 56 in their traversal along their paths of movement when motor 36 is stopped for exposure also varies. However, because the movable mirror assembly 46 is not used to reflect the projected image during exposure, the fact that the movable mirror assembly 46 is not always located in the same position during exposure is of no significant consequence. This variance in movable mirror positon is minimized by orienting the mirror assembly 46 so that the pinned connection to drive arm 64 from gear 56 is in the vicinity of bottom dead center when viewed as in FIG. 4. One actual position is seen in FIG. 3.

REGISTRATION CONTROL MECHANISM

The registration control mechanism 70 is best seen in FIGS. 2, 3 and 6-9. As seen in FIG. 3, the registration control mechanism 70 includes generally a registration cam assembly 71 driven by the timing shaft 58, a registration switch assembly 72 operated by cam assembly 71, and a cam control assembly 73 for controlling the cam assembly 71.

Figure 9:
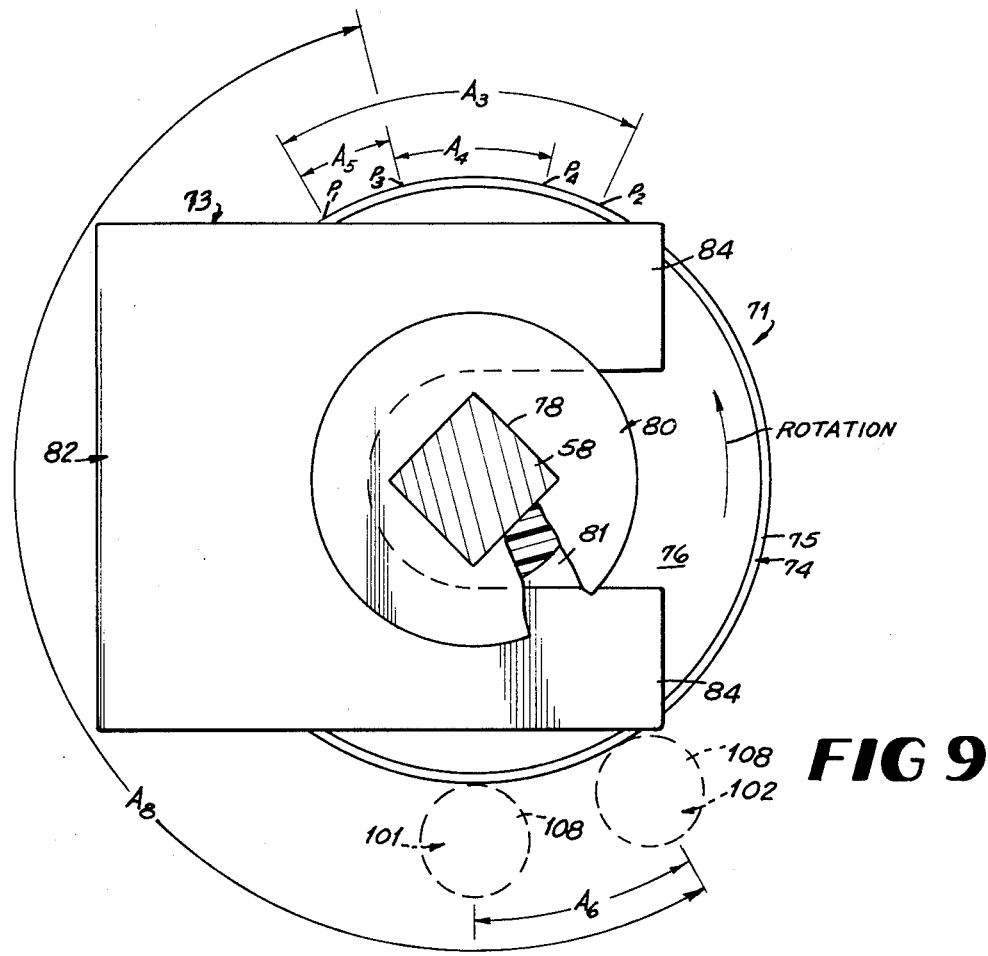
FIG. 9 is an enlarged view taken generally along 9—9 in FIG. 6.

The registration cam assembly 71 (FIGS. 6 and 9) includes generally an annular registration cam 74 which is slidably mounted on the timing shaft 58. The registration cam 74 includes an annular cam member 75 mounted on circular end plates 76. It will be seen that the portion of the timing shaft 58 between the main frame panels 59 is non-circular in cross-sectional shape as best seen in FIG. 9 and is illustrated as being square. The end plates 76 define complementary square holes 78 therethrough. The square section of the timing shaft 58 is slidably received through the square holes 78 in the end plates 76 so that the annular cam member 75 is concentrically located with respect to the timing shaft axis $A_T$, yet the registration cam 74 can be slidably moved axially along the timing shaft 58. Cam 74 is positively rotated with the shaft 58 because of the non-circular cross-sectional shape of the timing shaft 58 and the holes 78 through the end plates 76. It will further be noted that, since the timing spur gear 56 is rotated one complete revolution during each printing cycle, the timing shaft 58 and thus the annular cam member 75 are likewise rotated one complete revolution during the printing cycle. One end plate 76 is provided with a projecting boss 80 which defines an annular groove 81 therearound. The groove 81 is engaged by the cam control assembly 73 to locate the registration cam 74 axially along shaft 58 as will become more apparent.

As best seen in FIG. 6, the annular cam member 75 is axially divided into a length control section 91 and a registration control section 92. The length control section 91 serves to control the actuation of the paper cutter 26 to selectively cut the sheets S of copy paper to length while the registration control section 92 serves to stop the drive motor 36 when the cut sheet S of copy paper is centered in the exposure area EA with the transverse central axis $A_{TC}$ of the sheet S in registration with the transverse central axis $A_{TE}$ of the exposure area EA.

The length control section 91 defines an angularly oriented length control slot 94 therein while the registration control section 92 defines an angularly oriented registration control slot 95 therein. Both the length control slot 94 and the registration control slot 95 have a width $W_1$ seen in FIG. 6 with the length control slot 94 oriented at an angle $A_1$ with respect to the timing shaft axis $A_T$ while the registration control slot 95 is oriented at angle $A_2$ with respect to the timing shaft axis $A_T$. It will be seen in FIGS. 6 and 9 that the slot 94 extends along its central axis $A_{LC}$ from position $P_1$ to position $P_2$ around the periphery of the cam member 75 while the slot 95 extends along its central axis $A_{RC}$ from position $P_3$ to position $P_4$ around the periphery of the cam member 75. Because of their angular orientation, the length control slot 94 effectively subtends an angle $A_3$ around the periphery of the cam member 75 from point $P_1$ to point $P_2$ as seen in FIG. 9, while the registration control slot 95 effectively subtends an angle $A_4$ around the periphery of the cam member 75 from point $P_3$ to point $P_4$ as seen in FIG. 9. As illustrated in FIG. 6, the point $P_1$ on length control slot 94 is the leading end of that slot while the point $P_3$ on the registration control slot 95 is the leading end of that slot. It will further be seen from FIG. 9 that the points $P_1$ and $P_3$ at the leading ends of slots 94 and 95 respectively are effectively shifted angularly about the surface of the cam member 75 by the angle $A_5$ as will become more apparent. The length control slot 94 and the registration control slot 95 have the same effective length $L_R$ along the length of the cam member 75 as seen in FIG. 6.

The registration switch assembly 72 as seen in FIGS. 2 and 3 includes a stepped mounting plate 100 attached to the inside of the front main panel 59 and extending under the registration cam 74 so that the registration cam 74 can move back and forth over the mounting plate 100 in a direction generally parallel to the longitudinal axis of plate 100. The mounting plate 100 mounts a length control actuator switch assembly 101 thereon in operative association with the length control section 91 and length control slot 94 on cam 74. Plate 100 also mounts a registration control actuator switch assembly 102 thereon in operative association with the registration control section 92 and registration control slot 95 on cam 74.

Actuator switches 101 and 102 have the same construction as seen in FIG. 8 with a microswitch 104 having an actuator arm 105 and a rolling ball actuator 106 with a ball 108 movably mounted in holder 109 attached to the microswitch 104. When the ball 108 is depressed, the switch actuator arm 105 transfers microswitch 104 to one position while releasing ball 108 allows microswitch 104 to transfer to its opposite position.

Turning now to FIG. 6, the length control actuator switch 101 is mounted on the plate 100 so that the ball 108 thereon rolls along the peripheral surface 110 on the length control section 91 of the registration cam 74 along a path normal to the rotational axis $A_T$ of cam 74. Likewise, the registration control actuator switch 102 is mounted on the plate 100 so that the ball 108 thereon rolls along the peripheral surface 110 on the registration control section 92 of the registration cam 74 also along a path normal to the rotational axis $A_T$ of cam 74.

The switches 101 and 102 are located from each other a fixed distance $d_4$ (FIG. 6) apart in a direction parallel to the cam axis $A_T$ which is substantially equal to the distance $d_5$ between the point $P_1$ on length control slot 94 and point $P_3$ on registration control slot 95 in a direction parallel to the rotational axis $A_T$. This insures that switch assemblies 101 and 102 will be located at the same relative positions along the length of their associated control slots 94 and 95 at all times as will become more apparent. The switches 101 and 102 are rotationally shifted so that the balls 108 thereon are agularly shifted by the angle $A_4$ seen in FIG. 9. Because the control slots 94 and 95 are also angularly shifted by the angle $A_3$ (FIG. 9) with respect to each other in the same sense as switch assemblies 101 and 102 are angularly shifted, the base activation positions between switch assemblies 101 and 102 are effectively angularly shifted by the sum of angles $A_3$ and $A_4$ as will become more apparent. The leading end of point $P_3$ of the registration control slot 95 is shifted with respect to the ball 108 of registration switch assembly 102 by a convenient angle $A_8$ seen in FIG. 9 at the beginning of the print cycle as will become more apparent. The relative positions in the printing cycle at which the switch assemblies 101 and 102 are actuated are determined by the axially shifted position of cam 74 along timing shaft 58 as will become more apparent.

The cam control assembly 73 seen in FIGS. 2, 3, 6, 7 and 9 serves to axially shift the cam 74 along the timing shaft 58. Assembly 73 includes a stepped positioning member 82 which has a bifurcated end 84 (FIG. 9) received in the annular groove 81 in boss 80 on the registration cam 74 so that the registration cam 74 can rotate with respect to the positioning member 82; yet, the bifurcated end 84 on the positioning member 82 serves to positively locate the annular registration cam 74 axially along the timing shaft 58. The positioning member 82 is carried on a positioning bar 85 slidably mounted on the front main panel 59 of the base frame 22 seen in FIG. 3 so that the axis of movement of the positioning bar 85 is generally parallel to the timing shaft axis $A_T$. The positioning bar 85 slidably extends through the front main panel 59 and is provided with rack gear teeth 86 (FIG. 3) which mesh with a spur gear 88 forwardly of the front main panel 59. The spur gear 88 is mounted on a generally vertically extending support shaft 89 (FIG. 3) which in turn mounts a positioning spur gear 90 thereon above the main front panel 59. It will thus be seen that, as the positioning spur gear 90 is rotated, it in turn drives the spur gear 88 through the support shaft 89 to transfer the rotary motion of the positioning spur gear 90 into linear motion of the positioning bar 85. This serves to positively move the positioning member 82 and thus slidably move the registration cam 74 axially along the timing shaft 58.

Figure 7:
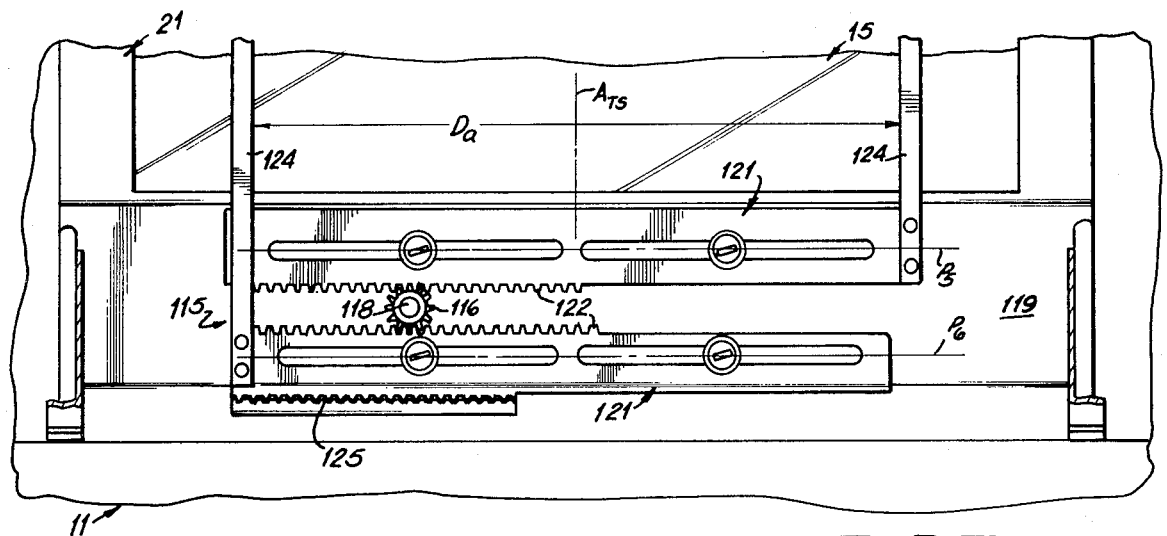
FIG. 7 is a view taken along line 7—7 in FIG. 3 illustrating the rest of the registration control mechanism.

The positioning spur gear 90 is driven by a manually operated drive mechanism 115 best seen in FIGS. 3 and 7. The drive mechanism 115 is mounted on the top section of housing 11 so that mechanism 115 drivingly engages the spur gear 90 when the top section of housing 11 is closed as seen in FIG. 3. The drive mechanism 115 includes a drive spur gear 116 attached to the support shaft 118 projecting through and rotatably journalled in the angled support section 119 of housing 11 immediately below the viewing screen 15 as seen in FIG. 3. The projecting end of the support shaft 118 projecting forwardly of housing 11 mounts a manually engagable control knob 120 thereon seen in FIGS. 1 and 3 so that the operator can rotate the drive spur gear 116 by rotating knob 120.

A pair of slide members 121 are mounted above and below the spur gear 116 inside the angled support section 119 and each is provided with rack gear teeth 122 (FIG. 7) whih is maintained in mesh with the teeth on spur gear 116. The slide members 121 are mounted on section 119 for sliding movement along slide paths $P_5$ and $P_6$ (FIG. 7) which are generally horizontal and parallel to the longitudinal screen axis $A_{LS}$ (FIG. 1) so that, as the spur gear 116 is rotated, the slide members 121 are driven in equal and opposite directions along their respective paths $P_5$ and $P_6$. One end of each slide member 121 is provided with an upstanding indicator member 124 seen in FIGS. 1, 3 and 7 which extends up behind the screen 15 so that, when the image is projected onto the viewing screen 15, the indicator members 124 cast shadows on screen 15 as seen in FIG. 1. The members 124 are oriented generally vertically and parallel to the screen transverse axis $A_{TS}$ and the slide members 121 engage the spur gear 116 so that the indicator members 124 are always equally spaced on opposite sides of the transverse screen axis $A_{TS}$.

The lower edge of the bottom slide member 121 is also provided with a rack gear section 125 whose teeth engage the teeth on the positioning spur gear 90 when the upper section of housing 11 is closed as seen in FIG. 3. The slide members 121 and registration cam 74 are adjusted so that, when rack gear section 125 meshes with positioning gear 90, the spacing between the indicator members 124 corresponds to the length of the cut sheet S of copy paper controlled from cam 74 and the cut sheet S of copy paper is stopped in the exposure station 29 so that the viewed image on screen 15 between indicator members 124 will be in registration with the projected image to exposure station 29 when the cut sheet S of copy paper is exposed.

Figure 10:
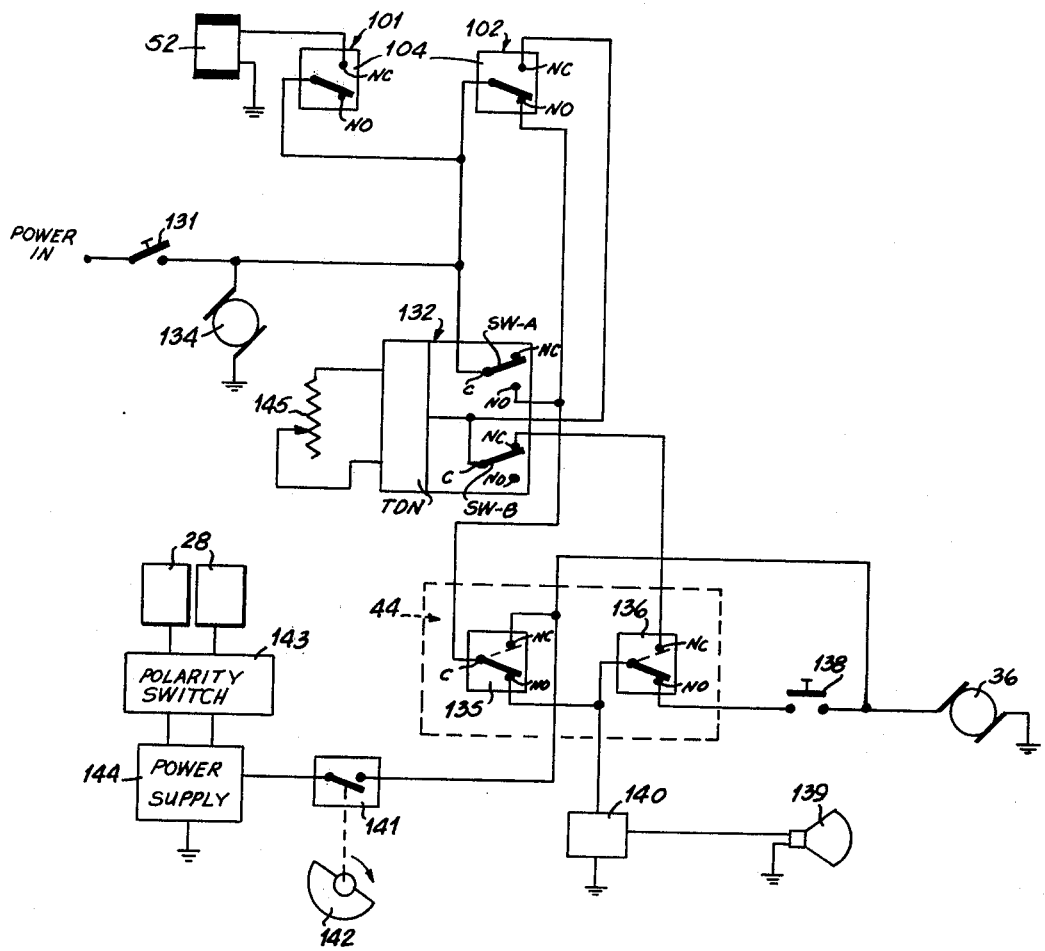
FIG. 10 is an electrical schematic diagram for the reader-printer.

The pertinent portions of the electrical control circuit 130 for the invention are schematically shown in FIG. 10. The various switches are shown in the position they occupy at the beginning of the printing cycle. The normally open contacts are labelled NO while the normally closed contacts are labelled NC. Power to circuit 130 is supplied through "on-off" power switch 131 (also see FIG. 1). Closure of power switch 131 supplies power to the common contacts C of the length control switch assembly 101 and the registration control switch assembly 102; the timer 132; and the fan motor 134. The fan motor 134 drives both the vacuum fan (not shown) for the conveyor 30 and pumps the toner in the developing section 31 in conventional manner. The timer 132 has first and second timed relay contact switches SW-A and SW-B whose positions are controlled by a timing network TDN of known construction. The cycle stop switch assembly 44 seen in FIGS. 4 and 10 is actually a pair of ganged microswitches 135 and 136 seen in FIG. 10.

When the power switch 131 is closed, power is supplied to the print switch 138 (FIGS. 1 and 10) of the printing controls 19 via the normally open contact NO (it is now closed by cam 74) in switch assembly 102 and the normally open contacts NO of switches 135 and 136 (these contacts are now closed by the cycle stop lug 42 on chain 35). The normally open contacts of switches 135 and 136 are also now powering the exposure lamp 139 through its power transformer 140 to project the image from the microfiche onto the viewing screen 15. When the operator wants to print a copy, the print switch 138 is manually closed momentarily to connect power to the drive motor 36 and start driving chain 35 and timing shaft 58. As soon as the cycle stop lug 42 on chain 35 clears the switch assembly 44, both switches 135 and 136 return to their normal positions. Thus, the normally closed contacts NC of switches 135 and 136 are closed while their contacts NO are opened. This serves to disable the print switch 138; however, power is still supplied to motor 36 via the normally open contact NO in switch assembly 102 and the normally closed contact NC in switch 135. This likewise supplies power to the corona switch 141 operated by cam 142 (FIGS. 3 and 10) on the forward end of the timing shaft 58.

As the timing shaft 58 is driven by motor 36, the cam 142 is rotated to close switch 141 and power the corona units 28 via power suply 144 and polarity selector switch 143 (also see FIG. 1) prior to the feeding of the unexposed copy paper from the supply roll 24. At the same time, the opening of the normally open contacts NO in switch 135 removes power from the exposure lamp 139 so that it is extinguished to prevent premature exposure of the copy paper. Transfer of switch 136 back t its normal position serves to connect the normally closed contact NC of timer switch SW-B to the lamp power transformer 140 through the normally closed contact NC of switch 136. This enables the exposure operation as will become more apparent.

As the feed chain section 38 moves with the drive chain 35 driven by motor 36, it engages the drive sprocket 39 (FIG. 4) on feed rolls 25 so that feed rolls 25 drive the copy paper as seen in FIG. 2 from the supply roll 24 through the paper cutter 26 and the corona units 28 to the nip between the leading hold down roll 40 and the belt conveyor 30. The corona units 24 impose a blanket electrostatic charge on the copy paper as it passes therethrough to prepare the copy paper for exposure. Because the feed rolls 25 and belt conveyor 30 are moving at the same effective speed, the driving of the copy paper is smoothly transferred from the feed rolls 25 to the belt conveyor 30. Shortly after the copy paper is drivingly engaged by the leading hold down roll 40 and the belt conveyor 30, the feed chain section 38 passes out of engagement with the drive sprocket 39 on feed rolls 25 so that the rolls 25 are free to rotate as the copy paper continues to be driven by the hold down roll 40 and belt conveyor 30.

Because the drive chain 35 is driving the conveying components feeding the copy paper toward the exposure station and the timing shaft 58, the timing shaft 58 rotates the registration cam 74 synchronously with the copy paper movement. When that length of copy paper corresponding to the setting of the registration cam 74 has been moved past the paper cutter 26, the length control slot 94 in the registration cam 74 moves into registration with the ball 108 on the length control switch assembly 101. This allows the switch assembly 101 to return to its normal position closing the normally closed contact NC thereof. Closure of contact NC in switch assembly 101 powers solenoid 52 associated with the paper cutter 26. This causes the trigger 43 to be pivoted counterclockwise as seen in FIG. 4 to release drive arm 33 whereupon spring 34 drives arm 33 away from its cocked position to operate paper cutter 26 and cut the copy paper into the sheet S with the length $L_a$ (FIG. 5) to which the registration cam 74 is set as will become more apparent. The cut sheet S continues to move on the belt conveyor 30 while the feeding of the copy paper from the supply roll 24 stops.

Because the registration cam 74 continues to synchronously move with the cut sheet S, the length control slot 94 is moved out of registration with the actuator ball 108 on the length control switch assembly 101. This opens the normally closed contact NC of switch assembly 101 to de-energize solenoid 52 to allow solenoid spring 47 to return the trigger 43 to its arresting position. The drive arm 33 on cutter 26, however, remains in its tripped position shown by dashed lines in FIG. 4 under the influence of spring 34.

As the registration cam 74 continues to move synchronously with the cut sheet S of copy paper, the registration control slot 95 in cam 74 moves into registration with the ball 108 on the registration control switch assembly 102 when the transverse centra axis $A_{TC}$ of the cut sheet S of copy paper moves into alignment with the transverse axis $A_{TE}$ of the exposure area EA in exposure station 29 (see FIG. 5). This transfers the switch assembly 102 back to its normal position to open the normally open contact NO and to close the normally closed contact NC of switch assembly 102. Opening contact NO of switch assembly 102 removes power from the drive motor 36 to stop it. An internal brake (not shown) is provided in the drive motor unit to insure positive stopping action so that the sheet S of copy paper is stopped with its transverse axis $A_{TC}$ in registration with the transverse axis $A_{TE}$ of exposure area EA.

By the time the actuator ball 108 on the registration control switch assenbly 102 moves into registration with the registration control slot 95, the timing spur gear 56 will have moved the drive arm 64 connected to the movable mirror assembly 46 to the position shown by solid lines in FIG. 3. This will have moved the reflective surface 48 on the movable mirror assembly 46 out of interference with the projected image path so that the projected image can be projected onto the exposure area EA via fixed mirror assembly 45. In this position, the machine is ready to expose the cut sheet S of copy paper in the exposure area EA.

The closure of the normally closed contact NC of switch assembly 102 serves to provide power to the common contact C in the timer switch SW-B and also to provide power to the timing network TDN in the timer 132. This starts operation of the timing network TDN in timer 132 while switches SW-A and SW-B remain in their normal position. Since the normally closed contact NC in the switch 136 is now closed, power is supplied to the lamp transformer 140 through the normally closed contact NC of the switch SW-B in the timer 132 to cause the lamp 139 to be illuminated and project the image to be copied onto the electrostatically charged cut sheet S of copy paper in registration in the exposure area EA. This serves to expose the charged copy paper to form a latent electrostatic image thereon corresponding to the projected image from the original document in the machine. When the timing network TDN times out, the switches SW-A and SW-B are transferred. The length of time that it takes for the time delay network TDN to time out is controlled by the adjustable resistance 145 controlled by knob 146 on the front of the reader printer 10 as seen in FIG. 1.

When the switches SW-A and SW-B are transferred upon the timing out of the time delay network TDN, the normally closed contact NC of the switch SW-B is opened to remove power from the lamp 139 and extinguish it. At the same time, the motor 36 is again powered through the now closed normally open contact NO of the switch SW-A connected to motor 36 via the normally closed contact NC of the switch 135. This causes the motor 36 to drive the belt conveyor 30 to start moving the exposed cut sheet S of copy paper out of the exposure station 29 and into the developing section 31. As soon as the registration cam slot 95 moves out of registration with the actuator ball 108 on registration switch assembly 102, the switch assembly 102 is again transferred to open contact NC thereof and close contact NO. Opening contact NC disables the time delay network TDN in timer 132 so that the switches SW-A and SW-B return to their normal positions. This also removes power from the common contact C in switch SW-B to prevent re-illumination of lamp 139 and again supplies power to motor 36 via contact NO in switch assembly 102 and contact NC in switch 135 so that motor 36 continues to operate even though contact NO in switch SW-A opens.

Motor 36 continues to drive the exposed sheet S of copy paper through the developing section 31 so that the latent electrostatic image is developed in known manner to form a fixed visual image on the copy paper corresponding to the latent electrostatic image. As the copy paper is engaged by the exit squeegee rolls 32, they continue to move the copy paper out of the machine to produce the final copy.

During the development of the exposed cut sheet S of copy paper, the cycle stop lug 42 on drive chain 35 is moved past the cocking cam 53 on the cutter drive arm 33. The cycle stop lug 42 engages the cocking cam 53 and moves the drive arm 33 back toward its cocked position shown by solid lines in FIG. 4 so that the end of the drive arm 33 rides over the trigger 43 until the trigger 43 latches behind the drive arm 33 to hold the drive arm 33 in its cocked position and thus prepare the paper cutter 26 for the next printing cycle. The cycle stop lug 42 on the drive chain 35 continues to move therewith until the cycle stop lug 42 engages the actuators on switches 135 and 136 in the cycle stop switch assembly 44 to transfer them away from their normal positions. This serves to open the normally closed contacts NC of switches 135 and 136 and close the normally open contacts NO thereof as shown by solid lines in FIG. 10. In this position, the power is again provided to the exposure lamp 139 to illuminate lamp 139 and project the image from the original document while at the same time again powering the manual print switch 138 so that the print cycle can be restarted by depressing the manual print switch 138.

As the drive chain 35 is driven back to its home position, it will also be noted that drive motor 36 rotates the timing spur gear 56 so as to move the mirror drive arm 64 until the movable mirror assembly 46 is moved back to the viewing position shown by dashed lines in FIG. 3. The adjustable stop 148 seen in FIG. 3 on the upper end of the drive arm 64 also engages the fixed mirror assembly 45 to pivot the fixed mirror assembly 45 down to its dashed line position seen in FIG. 3 so that the image projected by the exposure lamp 139 is directed onto the viewing screen 15 of the machine. This prepares the machine for the operator to view the image from the original document medium on the screen 15 so that another image can be selected for copying.

Because of the pre-established fixed relationships between the length control switch assembly 101, the registration control switch assembly 102, the length control slot 94 and the registration control slot 95, shifting the registration cam 74 axially along the timing shaft 58 serves to simultaneously position both the length control slot 94 with respect to the actuator ball 108 on length control switch assembly 101 and the registration cam slot 95 with respect to the actuator ball 108 on the registration control switch assembly 102 so that the camming slot 94 moves into registration with the actuator ball 108 on length control switch assembly 101 when the desired length of copy paper has been fed past the paper cutter 26 for cutting into sheet S while the camming slot 95 moves into registration with the actuator ball 108 on the registration control switch assembly 102 when the cut sheet S of copy paper moves into position in the exposure area EA with the transverse axis $A_{TC}$ of the cut sheet S of copy paper in registration with the transverse axis $A_{TE}$ of the exposure area EA. Thus, it will be seen that registration of the copy paper for exposure is always insured as will become more apparent.

It will be noted that there is always a fixed relationship between the length of the cut sheet S of copy paper and the position of the transverse axis $A_{TC}$ of the copy paper. This fixed relationship is that the transverse axis $A_{TC}$ of the cut sheet S of copy paper shifts one-half the distance by which the length of the cut sheet S of copy paper is increased or decreased. For instance, if one wants to increase the cut length of copy paper S by one inch, the transverse axis $A_{TC}$ of the cut sheet S of copy paper would shift one-half inch. Thus, it will be seen that the angle $A_1$ of the length control slot 94 in the registration cam 74 is twice the angle $A_2$ of the registration control slot 95 in the registration control cam 74 with respect to the cam axis $A_T$. Because the position of the switch assemblies 101 and 102 with respect to each other is fixed and the position of the slots 94 and 95 with respect to each other is fixed, shifting the cam 74 with respect to switch assemblies 101 and 102 automatically shifts the cut sheet S of copy paper in the exposure station 29 to insure registration of the copy paper transverse axis $A_{TC}$ with the exposure area transverse axis.

The angle $A_3$ about cam 74 subtended by the length control camming slot 94 is determined by the amount that the length of the cut sheet S of copy paper is desired to be changed. The angle $A_3$ is determined by the angle cam 74 must rotate per unit increase or decrease in the length of the cut sheet S of copy paper. While angle $A_3$ may be different for different machines, it is illustrated at about 55° to allow a maximum net change of about 6.5 inches in the length of the cut sheet S since about 8.5° of rotation of cam 74 corresponds to about a one inch change in paper length.

Since the cut sheet S of copy paper is shifted one-half of the net change in length for registration, the angle $A_4$ is dependent on angle $A_3$. Thus, where angle $A_3$ is about 55°, angle $A_4$ is about one-half angle $A_3$ or about 27.5°. The cam 74 and registration control switch assembly 102 are angularly set with respect to each other so that the switch assembly 102 is actuated when the movable mirror assembly 46 is in the vicinity of its forward printing position. In the illustrated machine, this is when the drive arm 64 to the spur gear 56 is about bottom dead center. The angular shift $A_8$ illustrated is about 180°–200°.

The angles $A_5$ and $A_6$, whose sum is the effective angular shift between the actuation of switch assemblies 101 and 102, are selected so that the cut sheet S of copy paper has the correct length in order that copy paper transverse central axis $A_{TC}$ will be in registration with the exposure area transverse central axis $A_{TE}$ when switch assembly 102 is actuated. The angles $A_5$ and $A_6$ are illustrated at about 17° and 30° respectively. These angles are, of course, dependent on the distance between the cutting point of paper cutter 26 and the exposure area transverse central axis $A_{TE}$.

The size of cut sheet S of copy paper is usually selected by the operator while the machine is in its viewing mode where the image is projected onto the viewing screen 15. This is done by operating the manually operated drive mechanism 115 best seen in FIGS. 1, 3 and 7. As the operator rotates the control knob 120, the indicator members 124 are simultaneously moved toward or away from the transverse screen axis $A_{TS}$ since the drive spur gear 116 connected to the control knob 120 simultaneously drives the slide members 121 through the rack gear teeth 122 thereon. As the indicator members 124 are shifted with respect to the transverse screen axis $A_{TS}$, the rack gear section 125 on the lower slide member 121 correspondingly drives the positioning spur gear 90.

This in turn causes the spur gear 88 to be driven to drive the positioning bar 85 through its rack gear teeth 86 to operate the cam control assembly 73. The motion of the positioning bar 85 is transferred to the registration cam 74 via the stepped positioning member 82 so that the registration cam 74 is axially shifted along the timing shaft 58 by the bifurcated end 84 on the positioning member 82. The shifting of the registration cam 74 axially along the timing shaft 58 effectively shifts the actuator ball 108 on the length control switch assembly 101 appropriately along the length of the length control slot 94 in the registration cam 74 while simultaneously shifting the actuator ball 108 on the registration control switch assembly 102 appropriately along the length of the registration control slot 95 in registration cam 74 so that slot 94 is moved into registration with the actuator ball 108 on the switch assembly 101 when that length of copy paper corresponded to that indicated between the indicator members 124 behind screen 15 has been fed past the cutter 26 and so that slot 95 is moved into registration with ball actuator 108 on switch assembly 102 when the cut sheet S of copy paper is centered along the length of exposure area EA. Thus, it will be seen that the length $L_a$ of the cut sheet S of copy paper is equal to the distance $D_a$ indicated between the indicator members 124 behind the screen 15 and that the sheet S of copy paper is cut to length $L_a$ and properly centered in the exposure area EA when both actuator balls 108 of switch assemblies 101 and 102 are located a distance $d_a$ from the leading ends of their respective camming slots 94 and 95 in cam 74 as seen in FIG. 6. This allows the operator to simply adjust the indicator members 124 behind viewing screen 15 until the desired length image to be copied is indicated and the length of the cut sheet S of the finished copy will be the same as that indicated on the viewing screen 15 between the indicator members 124.

What is claimed as invention is:

1. A registration control system for a copy machine adapted to copy images from an original document medium onto selected different length sheets of copy paper with the copy machine having a conveying means for transporting the sheets of copy paper along a conveying path through an exposure station with the image projected onto the sheet of copy paper in the exposure station with a transverse central axis normal to the conveying path, said registration control system comprising:

conveyor actuator means for causing the conveying means to move the sheets of copy paper through the exposure station; and adjustable control means for causing said conveyor actuator means to operate said conveying means so that each sheet of copy paper is moved through exposure station so that its transverse central axis normal to the conveying path is in registration with the transverse image central axis of the projected image during exposure of the sheet of copy paper, said adjustable control means including camming means synchronously driven with the movement of the sheets of copy paper through the exposure station, said camming means operatively associated with said conveyor actuator means to operate said conveyor actuator means when said camming means reaches a prescribed position; and adjustment means for effectively varying said prescribed position at which said conveyor actuator means is operated to compensate for changes in length of the sheets of copy paper so that the transverse central axis of each sheet of copy paper normal to the conveying path remains in registration with the transverse image central axis of the projected image during the exposure of the sheet of copy paper as the length of the sheets of copy paper is changed.

2. The registration control system of claim 1 wherein the sheet of copy paper is stopped in the exposure station during the exposure thereof by the projected image and wherein said adjustable control means causes said conveyor actuator means to stop the operation of the conveying means with the transverse central axis of the sheet of copy paper normal to conveying path in registration with the transverse image central axis of the projected image normal to the conveying path for exposure of the sheet of copy paper by the projected image.

3. The registration control system of claim 1 wherein said adjustable control means further includes indicator means for visually indicating that portion of the image on the original document medium that will be copied on the sheet of copy paper in the exposure station.

4. A registration control system for a copy machine adapted to copy images from an original document medium onto selected different length sheets of copy paper with the copy machine having a supply roll of copy paper, cutter means for cutting the sheets of paper from the supply roll and conveying means for transporting the sheets of copy paper along a conveying path through an exposure station with the image projected onto the sheet of copy paper in the exposure station with a transverse central axis normal to the conveying path, said registration control system comprising:
  cutter actuator means for operating the cutter means to cut sheets of copy paper from the supply roll;
  conveyor actuator means for causing the conveying means to move the sheets of copy paper through the exposure station; and
  adjustable control means interconnecting said cutter actuator means and said conveyor actuator means for causing said cutter actuator means to operate the cutter to cut sheets of copy paper from the supply roll of selected lengths and for causing said conveyor actuator means to operate said conveying means so that each sheet of copy paper cut from the supply roll is moved through exposure station so that its transverse central axis normal to the conveying path is in registration with the transverse image central axis of the projected image during exposure of the sheet of copy paper, said adjustable control means including camming means synchronously driven with the movement of the copy paper along the conveying path through the cutter means and the exposure station, said camming means operatively associated with said cutter actuator means and said conveyor actuator means so that said camming means operates said cutter actuator means when said camming means reaches a first prescribed position and for operating said conveyor actuator means when said camming means reaches a second prescribed position; and adjustment means for simultaneously adjusting both said first and second prescribed positions while maintaining a fixed relationship between said first and second prescribed positions so that different length sheets of copy paper can be cut by said cutter means while automatically causing each cut sheet of copy paper to be moved through the exposure station so that its transverse central axis normal to the conveying path is in registration with the transverse image central axis of the projected image during exposure of the cut sheet of copy paper as the length of the cut sheet of copy paper is changed.

5. The registration control of claim 4
  wherein said camming means includes an annular cam rotatable about its central axis synchronously with the movement of the copy paper through said cutter means and said exposure station, said annular cam defining a first annular camming surface operatively associated with said cutter actuator means and a second annular camming surface operatively associated with said conveyor actuator means, said cutter actuator means located at a first rotational position relative to said first camming surface and said conveyor actuator means located at a second rotational position relative to the second camming surface, said first camming surface defining a first actuating section thereon to operate said cutter actuator means when said first operating section on said first camming surface moves past said cutter actuator means and said second camming surface defining a second operating section thereon to operate said conveyor actuator means when said second operating section on said second camming surface is moved past said conveyor actuating means, said first and second operating sections having a fixed relationship with respect to each other; and
  wherein said adjustment means simultaneously effectively shifts said cutter actuator means relative to said first operating section and said conveyor actuator means relative to said second operating section while maintaining a fixed relationship between said cutter actuator means and said conveyor actuator means so that effectively shifting said cutter actuator means relative to said first operating section on said first camming surface adjustably varies the length of the cut sheet of copy paper cut by said cutter means while said conveyor actuator means is automatically effectively shifted with respect to said second operating section to operate said conveyor actuator means and cause said conveying means to move each cut sheet of copy paper through the exposure station so that its transverse central axis normal to the conveying path is in registration with the transverse image central axis of the projected image during exposure of the cut sheet of copy paper.

6. The registration control system of claim 5 wherein said adjustment means is manually adjustable to permit manual selection of the length of the cut sheets of copy paper.

7. The registration control system of claim 6 wherein said adjustable control means further includes indicator means for visually indicating that portion of the image on the original document medium that will be copied on the sheet of copy paper in the exposure station, said indicator means operatively connected to said adjustment means so that the visually indicated portion of the image on the original document medium corresponds in length to that of the cut sheet of copy paper to be exposed in the exposure station.

8. The registration control system of claim 7 wherein the sheet of copy paper is stopped in the exposure station during the exposure thereof by the projected image and wherein said adjustable control means causes said conveyor actuator means to stop the operation of the conveying means with the transverse central axis of the sheet of copy paper normal to conveying path in registration with the transverse image central axis of the projected image normal to the conveying path for exposure of the sheet of copy paper by the projected image.

9. The registration control system of claim 8 wherein the copy machine is a micrographic reader-printer; wherein the original document medium is micrographic film, the micrographic reader-printer also having a viewing screen and projection means for selectively projecting an optical image of the original micrographic film alternatively onto the viewing screen for viewing and onto the exposure station to expose the copy paper; and wherein said indicator means is operatively associated with the viewing screen to visually indicate that portion of the image projected from the micrographic film onto the viewing screen which will be copied on the sheet of copy paper in the exposure station.

10. The registration control system of claim 9 wherein the viewing screen has a transverse screen central axis in registration with the transverse image central axis projected thereon; and
wherein said indicator means includes a pair of indicator members oriented generally parallel to the transverse screen axis, said indicator members operatively connected to said adjustment means so that said adjustment means simultaneously moves said indicator members toward and away from the transverse screen central axis with said indicator members on opposite sides of the transverse screen central axis and always equally spaced from the screen central axis with the distance between said indicator members corresponding to the length of the cut sheet of copy paper to be exposed in the exposure station.

* * * * *